PROCESS FOR MANUFACTURING A MAGNETIC SOUND HEAD CORE

Filed Jan. 9, 1969 2 Sheets-Sheet 1

INVENTORS.
CHARLES O. GINGERICH
EUGENE P. HEUPEL

BY David M. Bunnell
ATTORNEY.

June 15, 1971 C. O. GINGERICH ET AL 3,584,375

PROCESS FOR MANUFACTURING A MAGNETIC SOUND HEAD CORE

Filed Jan. 9, 1969 2 Sheets-Sheet 2

United States Patent Office 3,584,375
Patented June 15, 1971

3,584,375

PROCESS FOR MANUFACTURING A MAGNETIC SOUND HEAD CORE

Charles O. Gingerich and Eugene P. Heupel, Lexington, Ky., assignors to International Business Machines Corporation, Armonk, N.Y.

Filed Jan. 9, 1969, Ser. No. 790,139
Int. Cl. H01f 7/06
U.S. Cl. 29—603 11 Claims

ABSTRACT OF THE DISCLOSURE

A magnetic sound head core having a record-playback gap and an erase gap whose longitudinal axes are disposed at an angle to each other is assembled from a U shaped magnetizable body of, for example, mumetal, one side of which is first fixed to a wear plate. A section of the magnetizable body is ground away to divide the body into two members whose opposing faces are non-parallel and, at the same time, a groove is formed in the face of the wear plate below the ground away portion of the magnetizable body. The two members remain fixed to the plate which holds them in their original location and a third magnetizable member and two gap filling non-magnetizable shims are provided to fill the channel between the two members. One end of the third magnetizable member has a cross section similar to that of the channel but of lesser dimension to provide the record-playback and erase gaps on either side which are filled by the shims. Preferably, the combined dimension of the shims and the third member is slightly greater than the width of the channel so that when the shims and the third member are forced into the channel by applying vertical pressure to a second wear plate placed over them, they are retained in interference contact with the faces of the two members. As the third member and shims enter the channel, the co-acting angled faces of the shim and members forming the angled gap, act to force all of the parts into intimate contact with each other due to the camming action provided by the horizontal component of force created by the angled surfaces.

BACKGROUND OF THE INVENTION

Magnetic head assemblies provide a core of magnetizable material which tracks in relation to magnetic recording media. Pole portions of the core are wound with coils of fine wire and the portions of the core in contact with the tape are split at at least one point to provide a gap. When in the recording mode, the current generated in the coils, for example, by a microphone and amplifier produces a magnetic flux in the core members which is concentrated at and passes across the gap. As the recording media, such as magnetic tape, moves past the gap, the flux causes the tape to become magnetized in accordance to the current flowing in the coils. When in the listening mode the magnetic fields existing on the tape produce a magnetic flux in the members which in turn induces a current in the coils which is then passed, for example, through an amplifier to a loud speaker. In order to erase previously recorded information on the tape prior to recording new information, and erase gap can be provided ahead of the record-playback gap through which an alternating flux is passed which acts to neutralize the magnetic fields existing on the tape. This erasing device can be provided as a separate structure on the head but conveniently is combined into a core having three pole pieces resulting in an E shaped core structure with both an erase and a record-playback gap. In a co-pending application, Ser. No. 768,084, entitled, "Multi-Gap Magnetic Head Having Gaps Disposed at an Angle to Each Other and Method of Forming Gaps" by Charles N. Sprott and Joe A. Young, filed Oct. 16, 1968, and assigned to the assignee of this application, the sound interference problems associated with closely spaced multigap single magnetic heads are discussed wherein a single center pole piece is utilized as one of the pole pieces for both the erase gap and the record-playback gap. To eliminate the hum from the AC power supply, a portion of the playback winding must be mounted on the center pole piece as well as the outer pole piece. However, when this is done a pre-echo results from magnetic flux which is incidentally introduced into the erase gap by the recorded material and which is picked up by the portion of the playback winding on the center pole piece. The pre-echo problem is overcome by Sprott and Young by using gaps which have their longitudinal axis disposed at an angle to each other, for example, preferably at about a 45° angle as is described in the above mentioned co-pending application. However, the angled gaps create a manufacturing problem. Previously, the method employed to produce a two-gap head involved providing a pair of L or J shaped core members whose shorter ends were sandwiched around and properly aligned in a jig with a third core member and two shims of non-magnetizable material which formed the gaps on each side of the third core member. Horizontal clamping pressure was then applied to force the vertical sides of the core members and shims into intimate contact. This is illustrated in FIG. 1a where 1, 2, and 3 represent the magnetizable core members and 4 and 5 the non-magnetizable shims with the pressure being applied in the direction of the arrows. In the improved head structure slanted faces are present which tend to slide over one another when horizontal pressure is applied as in the above described manufacturing method. This is illustrated in FIG. 1b where 6, 7, and 8 represent the magnetizable core members, 6 and 7 of which have angled faces abutting shim 9 so that when horizontal pressure is applied in the direction of the arrows, member 7 tends to slide out of alignment with the members 6 and 8. Such misalignment, even if slight, results in a deterioration of the sound recording and reproducing qualities of the core structure.

BRIEF DESCRIPTION OF THE INVENTION

An assembly procedure has now been provided which overcomes the above mentioned difficulties and actually takes advantage of the angled surfaces in contact to provide a self-locking and self-aligning system.

In accordance with the invention there is provided a process for assembling a core for a magnetic sound head having gaps disposed at an angle to each other comprising the steps of: providing a body of magnetizable material and fixing a plate of non-magnetizable material to one side of the body; removing a section from the body so as to divide it into two members having opposing faces which are non-parallel, the divided members being held in their original position by the plate; providing a third member of magnetizable material an end of which has a cross section corresponding to the removed section of the body but which is of a lesser width between the non-parallel sides; providing shims of non-magnetizable material on each of the sides of the third member the shims being of a thickness such that the combined thickness of the shims and the width of the third member is at least equal to the distance between the opposing faces of the first two members at any given point when the shims and the third member are assembled between the faces; applying pressure to force the shims and the third member to fill the space between the opposing faces; and fixing a second plate of non-magnetizable material to the side of said body opposite said first plate.

A sound head core having improved properties is provided by using shims whose width is greater than the thickness of the magnetizable members and providing plates with grooves to receive the edge portions of the shims which overhang the top and bottom faces of the magnetizable members. The overhang avoids the possibility of magnetic shorting across the gaps.

DETAILED DESCRIPTION

The foregoing and other objects, features, and advantages of the invention will be apparent from the following more particular description of preferred embodiments of the invention as illustrated in the accompanying drawings.

Figure 1B:
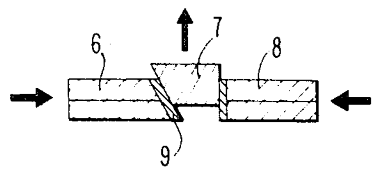
FIGS. 1*a* and 1*b* are sectional views illustrating the assembly of magnetic sound head cores by prior methods.
Figure 1A:
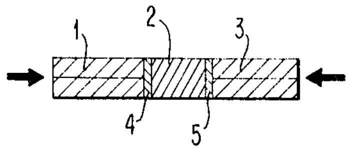
Figure 2A:
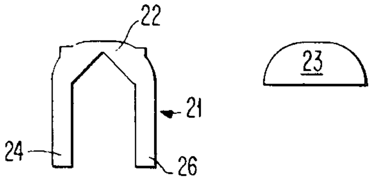
FIGS. 2*a* through 2*d* are elevational views illustrating the formation of a sub-assembly in an embodiment of the process of the invention.
Figure 2B:
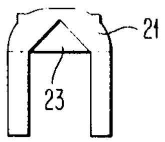

Turning now to FIG. 2*a*, magnetizable body 21 is formed in the shape of a U by affixing two thin U-shaped members of mumetal (a nickel iron-copper alloy) together to form a laminate. Other magnetizable materials having a high permeability can be employed as is well known in the art such as, for example, ferrites. Body 21 has a tracking portion 22 at its closed end and pole portions 24 and 26 extending therefrom. Wear plate 23 is of a semi-circular shape whose outer circumference roughly corresponds to the outer circumference of body 21. Wear plate 23 is of brass but other well known suitable nonmagnetic materials having a low permeability can be employed. Plate 23 is first affixed to one side of body 21 as shown in FIG. 2*b* by any suitable means, for example, a hardenable epoxy adhesive compound. The adhesive is cured and set by heating the assembled pieces in an oven.

Figure 2C:
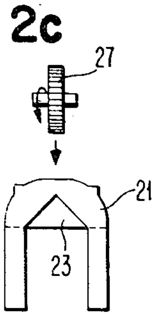
Figure 2D:
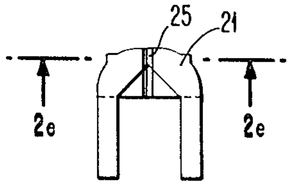
Figure 2E:
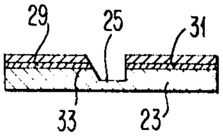
FIG. 2*e* is a sectional view of the sub-assembly pictured in FIG. 2*d* taken along line *e—e*.

The assembled body 21 and wear plate 23 are then placed in a suitable holding device and a trapezoidal shaped groove or channel 25 is formed by passing a grinding wheel 27 or other suitable cutting device across the face of body 21 and wear plate 23 as illustrated in FIGS. 2*c*, 2*d*, and 2*e*. Conveniently the grinding operation is carried out in two steps with the wheel first aligned perpendicular to the plane of the bodies to cut a square groove and then aligned at a 45° angle to the vertical in order to cut the angled side. Channel 25 separates body 21 into two members 29 and 31 and extends into surface 33 of plate 23.

Figure 3A:
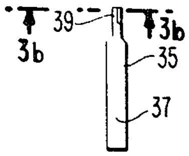
FIG. 3*a* is an elevational view of a third magnetizable member wherein the dimensions are somewhat exaggerated for the purposes of illustration.
Figure 3B:
FIG. 3*b* is a sectional view of the member of FIG. 3*a* taken along line *b—b*.
Figure 3C:
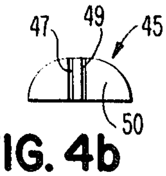
FIG. 3*c* is an elevational view of a second wear plate.
Figure 3D:
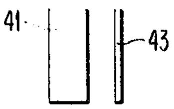
FIG. 3*d* are elevational views of gap forming shims.

The remaining parts of the core are illustrated in FIGS. 3*a*, 3*b*, 3*c*, and 3*d*. A third magnetic member 35 comprised of a laminate of two pieces of mumetal of approximately equal thickness and which laminate is substantially equal to the thickness of body 21 has a pole portion 37 at one end and a tracking portion 39 at the other end. This tracking portion is cut or ground from a rectangular cross-section to a trapezoidal cross section corresponding to the channel between members 29 and 31 but has a smaller dimension to provide record-playback and erase gaps when set in place in channel 25. The cross section of the end 39 of member 35 is illustrated in FIG. 3*b*. Erase gap shim 41 and record-playback gap shim 43 each of a non-magnetic material, which is a beryllium-copper alloy, are provided. A suitable record-playback gap shim is, for example, about .0001 inch in thickness and a suitable erase gap shim is, for example, approximately .0050 inch in thickness. The shims together with the width dimension of end 39 of member 35 make up an assembly which is at least wide enough to fill the channel 25. Preferably they are slightly wider than the dimension of channel 25 at any point. This provides an interference fit of the parts when shims 41 and 43 and member 35 are assembled in the channel 25. Shims 41 and 43 are preferably slightly wider than the thickness of body 21 and member 35 so that they extend above and below the top and bottom surfaces of the members when they are assembled in the channel 25. This assures that the shims will completely fill the gaps between the members and also provide a small overhang. This overhang avoids the possibility of magnetic shorting across the gaps. Wear plate 45, illustrated in FIG. 3*c*, is similar in dimension to wear plate 23 and in the embodiment shown is provided with recesses or grooves 47 and 49 in face 50 to receive the overhang of the edges of shims 41 and 43 when they are in place in channel 25.

Figure 4A:
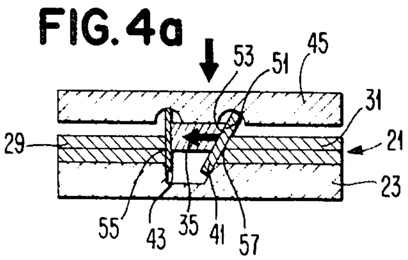
FIGS. 4*a* and 4*b* are sectional views with the dimensions somewhat exaggerated for the purposes of illustration showing the assembly of the first sub-assembly and the remaining members.
Figure 4B:
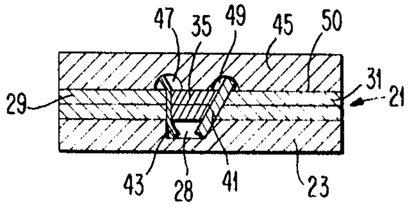
Figure 4C:
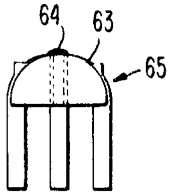
FIG. 4*c* is an elevational view of the core assembly prior to final grinding.

The assembly procedure of the shims and third member in channel 25 is illustrated in FIGS. 4*a*, 4*b*, and 4*c*. The magnetic body 21 and wear plate 23 sub-assembly are clamped in a suitable fixture. Member 35 is placed in position in channel 25 and a spot of epoxy adhesive is applied to the top surface of members 29, 31 and 35, and then wear plate 45 is placed in position over members 29, 31, and 35 in contact with the adhesive. Member 35 and wear plate 45 are then raised slightly and shims 41 and 43 are inserted in channel 25 on each side of member 35. Pressure is applied to the top of wear plate 45 as shown by the arrow in FIG. 4*a* so that member 35 and shims 41 and 43 are forced into interference contact in channel 25. The angled surfaces 51 and 53 produce a camming action and the resulting horizontal component of force, as shown by the arrow, forces the shims 41, 43, and member 35 into intimate contact in channel 25 with faces 55 and 57 of members 29 and 31. Member 35 moves into channel 25 until plate 45 is in contact with body 21 (with a thin adhesive layer between) at which point the top and bottom faces of member 35 are exactly aligned with the top and bottom faces of members 29 and 31 as shown in FIG. 4*b*. The shims 41 and 43 which are wider than members 35, 29, and 31 extend above and below their faces into channel portion 28 of wear plate 23 and into recesses 47 and 49 in face 50 of wear plate 45. This not only assures complete filling of the gaps by the shims but also the overhang has been found to produce a beneficial effect in the recording properties by preventing short circuiting or leakage of flux around the edges of the gaps. The assembly is placed in an oven, for example, at about 100° C. for about 20 minutes to cure the adhesive.

Figure 5B:
FIG. 5*b* is an end view of the core assembly of FIG. 5*a*.
Figure 5A:
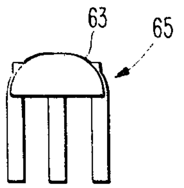
FIG. 5*a* is an elevational view of the completed core assembly produced by the embodiment of the invention illustrated in FIGS. 2–4.

Any excess length of the shims extending beyond the edges 63 of assembly 65 which is illustrated in FIG. 4*c* is trimmed off square with edge 63 and the remaining space around shims 41 and 43 and the channel portion 28 and grooves 47 and 49 are filled with either epoxy or other suitable conventional potting compound. This is conveniently accomplished by applying a drop 64 of potting compound to edge 63 in the area of the shims, placing the assembly 65 in a bell jar, and drawing a vacuum of approximately 27 inches for about one minute. It should be noted that the channel portion 28 and grooves 47 and 49 (FIG. 4*b*) preferably extend the width of wear plates 23 and 45 respectively. This provides for through openings in assembly 65 which facilitates the complete filling of the voids by the potting compound in the critical area around the tracking portion of assembly 65. The epoxy is then cured by placing the assembly in an oven, for example, for 15 minutes at about 100° C. Edge 63 is ground to the final contour as illustrated in FIGS. 5*a* and 5*b*. In cross section 5*b* the filled grooves are seen as darker portions 58.

Figure 6:
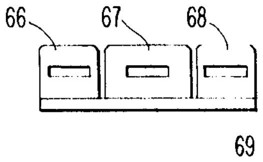
FIG. 6 is an end view of a coil sub-assembly.
Figure 7:
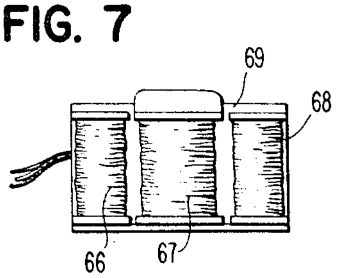
FIG. 7 is an elevational view of the coil sub-assembly of FIG. 6.
Figure 8:
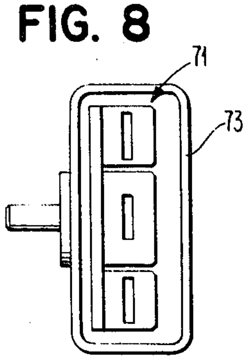
FIG. 8 is an end view of a head casing and coil sub-assembly in place therein.
Figure 9:
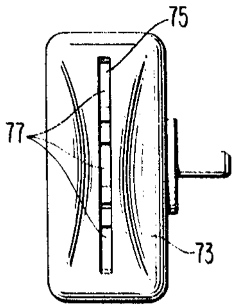
FIG. 9 is an end view of the head case.
Figure 10:
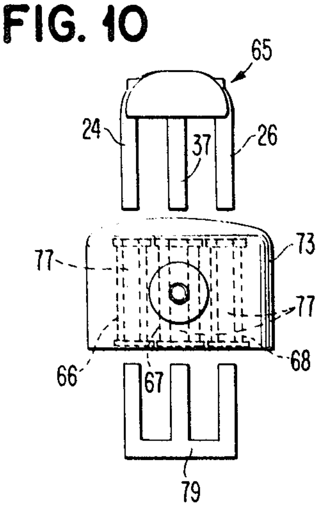
FIG. 10 is an exploded elevational view showing the final assembly of the magnetic head.
Figure 11:
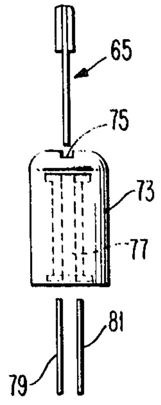
FIG. 11 is a side elevational view with parts broken away showing the core and retaining pieces in place in the head.

The magnetic core assembly is then ready to be inserted in the sound head casing to complete a sound head assembly. The head assembly is illustrated, for example, in FIGS. 6 through 11. FIGS. 6 and 7 show the wire wound bobbins 66, 67, and 68 in position on holding board 69. FIGS. 8 and 9 show the coil assembly 71 in place in metal sound head case 73. Slot 75 in the front face 74 of head case 73 is adapted to receive magnetic core assembly 65 with the pole portions 24, 26, and 37 (FIGS. 9 and 10) extending into the center openings 77 provided in bobbins 66, 67, and 68. E shaped pieces of mumetal 79 and 81 then inserted into the openings 77 on either side of pole pieces 24, 26, and 37 from the back side of case 73 which frictionally engage the surfaces of and securely retain assembly 65 in head case 73. This construction allows for easy replacement of the core assembly 65 without disturbing the remainder of the components comprising the sound head.

Figure 12:
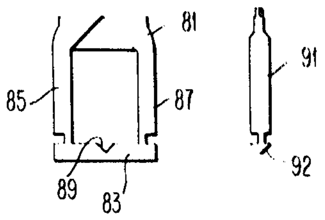
FIG. 12 shows elevational views of magnetic members for another embodiment of the process of the invention.

In another embodiment illustrated in FIG. 12, magnetic body 81 is provided with a bar 83 extending between the end pole portions 85 and 87. The bar portion is notched at 89. Member 91 is provided with a triangular shaped extension 92 adapted to fit into notch 89. This construction has been found to facilitate the correct aligning of member 91 with respect to magnetic body 81. The bar 83 and extension 92 are cut off after completion of the core assembly.

While the invention has been particularly shown and described with reference to preferred embodiments thereof, it will be understood by those skilled in the art that the foregoing and other changes in form and details may be made therein without departing from the spirit and scope of the invention.

We claim:

1. Process for making a core assembly for a magnetic sound head having angled gaps comprising the steps of:

providing a body of magnetizable material, fixing a first plate of non-magnetizable material to one side of said body, removing a section from said body so as to divide said body into two members having opposing faces which are non-parallel, said members being held in place by said first plate, providing a third member of magnetizable material an end of which has a cross-section corresponding to the removed section of said body but which is of a lesser width between the non-parallel sides, providing a shim of non-magnetizable material on each of said sides of said third member said shims being of a thickness such that the combined thickness of said shims and the width of said third member is slightly greater than the distance between said opposing faces at any given point when said shims and said third member are assembled between said faces, placing a second plate of non-magnetizable material over said third member and said shims, applying pressure to said second plate to force said shims and said third member to fill the space between said opposing faces in interference contact with said faces, and fixing said second plate to said members.

2. Process for making a core assembly for a magnetic sound head having angled gaps comprising the steps of:

providing a body of magnetizable material, fixing a first plate of non-magnetizable material to one side of said body, removing a trapezoidal shaped section from said body so as to divide said body into two members having opposing faces which are non-parallel while forming a channel in the face of said plate in the area which bridges said portions, providing a third member of magnetizable material an end of which has a trapezoidal cross-section corresponding to the removed portion of said body but which is of a lesser width between the non-parallel sides, providing shims of non-magnetizable material on each of said non-parallel sides of said third member said shims being of a thickness such that the combined thickness of said shims and the width of said third head portion is slightly greater than the distance between said opposing faces at any given point when said shims and said third member are assembled between said faces and said shims being wider than the thickness of said members placing a second plate of non-magnetizable material over said third member and said shims, said plate having recessed portions to receive the edges of said shims, applying pressure to said plate to force said shims and said third member to fill the space between said opposing faces and interference contact with said faces such that said shims extend above and below the horizontal faces of said body and third member into said channel and said recesses, and fixing said second plate to said body and third member.

3. The process of claim 2 wherein said body is U-shaped and whose extending sides form a pair of extending pole pieces.

4. The process of claim 3 wherein one end of said third member forms a unitary extending pole piece.

5. The process of claim 2 including the steps of grinding the lower edges of the plates, members and shims so that the lower edges are substantially co-extensive and then filling the recesses and channel in said plates with a heat hardenable material.

6. The process of claim 2 wherein said plates are fixed to said body and third member with a heat hardenable adhesive composition.

7. The process of claim 4 wherein said body is provided with a notched bar extending between said pole pieces and said third member is provided with an extension on the end of said pole piece which is adapted to fit said notch when said body and third member are assembled in proper alignment.

8. The process of claim 7 including the step of removing said bar and extension from said assembly.

9. Process for making a core assembly for a magnetic sound head having angled gaps comprising the steps of:

providing a body of magnetizable material, fixing a plate of non-magnetizable material to one side of said body, removing a section from said body so as to divide said body into two members having opposing faces which are non-parallel, said members being held in place by said plate, providing a third member of magnetizable material an end of which has a cross-section corresponding to the removed section of said body but which is of a lesser width between the non-parallel sides, providing a shim on each of said sides of said third member said shims being of a thickness such that the combined thickness of said shims and the width of said third member is at least equal to the width of the removed section, and applying pressure to said shims and said third member to force said shims and said third member between said opposing faces in contact with said faces.

10. Process for making a core assembly for a magnetic sound head having angled gaps comprising the steps of:

providing a body of magnetizable material, fixing a plate to one side of said body, removing a section from said body so as to divide said body into two members having opposing faces which are non-parallel, said members being held in place by said plate, providing a third member of magnetizable material an end of which has a cross-section corresponding to the removed section of said body but which is of a lesser width between the non-parallel sides, providing a shim of non-magnetizable material on each of said sides of said third member said shims being of a thickness such that the combined thickness of said shims and the width of said third member is slightly greater than the distance between said opposing faces at any given point when said shims and said third member are assembled between said faces, applying pressure to said shims and said third member to force said shims and said third member between said opposing faces in interference contact with said faces.

11. Method of making a magnetic sound head core having angled gaps comprising:

fixing a pair of magnetizable members in spaced apart relation to one another with their nearest faces being non-parallel, providing a third magnetizable member an end portion of which has a cross-section corresponding to the space defined by the planes of the top and bottom faces of said magnetic members and the planes of said nearest faces but said cross-section being of lesser width than the distance between the planes of said nearest faces, providing gap forming shims on each side of said third member, said shims being of a thickness such that said shims and the end portion of said third member will at least fill the space between said nearest faces, and moving said third member and said shims into the space between said nearest faces and into contact with said nearest faces.

References Cited

UNITED STATES PATENTS

| | | | |
|---|---|---|---|
| 2,736,776 | 2/1956 | Camras | 179—100.2C |
| 2,885,488 | 5/1959 | Andrews | 179—100.2C |
| 3,246,383 | 4/1966 | Peloschek et al. | 29—603 |

CHARLIE T. MOON, Primary Examiner

C. E. HALL, Assistant Examiner

U.S. Cl. X.R.

179—100.2C; 340—174.1F; 346—74MC